United States Patent [19]
Nadas et al.

[11] 3,874,484
[45] Apr. 1, 1975

[54] RESETTING DEVICE FOR BRAKES

[75] Inventors: Gyula Nadas, Eching; Bernd Wosegien, Munich, both of Germany

[73] Assignee: Knorr-Bremse GmbH, Munich, Germany

[22] Filed: Nov. 19, 1973

[21] Appl. No.: 416,770

[30] Foreign Application Priority Data
Nov. 17, 1972 Germany............................ 2256431

[52] U.S. Cl. ................................. 188/197, 403/360
[51] Int. Cl. .............................................. F16d 65/50
[58] Field of Search..... 189/196 M, 196 B, 196 BA, 189/196 D, 197, 200, 202, 203; 403/44, 46, 164–166, 360, 361

[56] References Cited
UNITED STATES PATENTS

| | | | |
|---|---|---|---|
| 1,006,362 | 10/1911 | Dawson | 403/360 |
| 1,125,035 | 1/1915 | Anderson | 188/196 D |
| 1,600,822 | 9/1926 | Hedgcock | 188/197 X |
| 2,920,724 | 1/1960 | Margetic et al. | 188/196 BA |

*Primary Examiner*—Duane A. Reger
*Attorney, Agent, or Firm*—Edmund M. Jaskiewicz

[57] ABSTRACT

A device for resetting an automatic adjusting device on a brake rod linkage, particularly for railway vehicles, is mounted between an adjustable rod and a brake rod linkage connecting heat rotatably coupled to the rod coaxially therewith and axially moveable with respect to the rod. The rod and head are each provided with mutually engagable serrations or teeth and a cap is mounted on the rod to extend over and enclose the end of the connecting head. A spring is positioned between a portion of the cap and a disc is retained by a snap ring on the connecting head for urging the serrations of the head and rod into mutual engagement. Upon release of the brakes, the rod can be rotated with respect to the connecting head.

2 Claims, 1 Drawing Figure

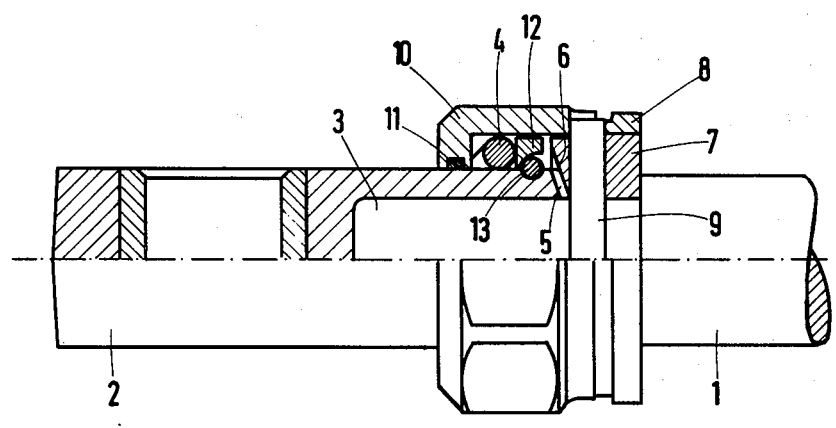

RESETTING DEVICE FOR BRAKES

The present invention relates to a device for resetting an automatic adjusting device on the brake rod linkage such as employed in railway vehicles and the like, more particularly, to the rotatable coupling arrangement between an adjustable rod and brake rod linkage connecting head which permits adjustment of the rod with respect to the head.

The resetting device to which the present invention relates is inserted into the brake rod linkage of a braking system for railway and other types of vehicles and is employed for adjusting the length of the brake linkage so as to maintain a constant clearance between the brake shoes and the brake surfaces independently of the wear of the brake shoes or the surfaces. In addition, when either the brake shoes or the brake linings which constitute the braking surfaces are replaced the resetting devices permit a suitable adjustment to establish and to maintain a predetermined clearance between the brake shoe and the brake lining.

Various forms of automatic adjusting devices for brake rod linkages of railway vehicles have been proposed for the purpose of reducing the brake clearance when the clearance between the brake shoe and brake lining increases after a period of use.

An automatic adjusting device for reducing the brake clearance between the brake lining and the brake shoe has been proposed and comprises a device mounted as a component of the brake rod linkage between the brake drum and the corresponding brake shoes. The device is mounted into the rod linkage and cooperates with an abutment on another component of the linkage in order to adjust continuously the total length of the rod linkage to maintain the brake clearance constant. This adjusting device comprises a rod and an adjusting spindle axially displaceable with respect to the rod with the rod and spindle being mounted on components of the rod linkage to be axially displaceable with respect to each other.

A device has also been provided for manually resetting the adjusting device when brake shoes or brake linings are replaced. The rod is provided with a linkage connecting head which is rotatable with respect to the rod and coaxial therewith. The head is provided with a sleeve which extends over the rod. The rod is detachably and rotatably coupled to the connecting head and the sleeve is provided with a conical friction surface which is urged against a corresponding conical friction surface on the adjacent end of the rod. A resilient tightening disc may be provided between the connecting head and the rod. A grip ring may be provided for manual operation of the device.

Adjusting devices for brake rod linkages of railway vehicles have also been provided which are not automatically operated but must be adjusted manually. Such devices are included as a component of the brake rod linkage and essentially comprise an adjusting spindle having an external thread and a tubular rod having an internal thread mounted thereon. The rod is provided with a connecting head to the rod linkage with the head being rotatable with respect to the rod and coaxial therewith. The head is provided with a sleeve which extends over the rod. During the braking operation, friction forces are produced between the sleeve and the adjacent end of the rod to prevent rotation between the sleeve and the rod. In order to prevent such rotation when the brakes are released, a compression spring is clamped between the connecting head and the adjacent end of the rod. However, the spring does not prevent manual rotating of the rod with respect to the connecting head when the brake is released. Thus, the spindle is adjustably threaded in or out with respect to the rod.

It is therefore the principle object of the present invention to provide a novel and improved resetting device of the type disclosed herein.

It is another object of the present invention to provide such a resetting device which is simple in structure and assembly, can be readily operated and occupies a minimum of space.

According to one aspect of the present invention a device for resetting an automatic adjusting device on a brake rod linkage for railway vehicles and the like may be provided between an adjustable rod and a brake rod linkage connecting head which is rotatable coupled to the rod coaxially therewith and is axially moveable with respect to the rod. Mutually engagable serrations are provided on the cooperating ends of the rod and connecting head and a cap is mounted on the rod so as to extend over the end of the connecting head. A spring is provided within the cap to act between a portion of the cap and a suitable abutment on the connecting head in order to urge the serrations into mutual engagement. During braking, the serrations are pressed firmly into mutual engagement by braking forces in the linkage, but upon release of the brakes the serrations are mutually engaged only under the force of the spring. The rod can then be adjusted with respect to the connecting head by rotation of the rod and causing the serrations to move with respect to each other.

Other objects and advantages of the present invention will be apparent from the drawing, which is exemplary, and is a side elevational view of a resetting device according to the present invention with a portion of the device being shown in section.

Proceeding next to the drawing a specific embodiment of the present invention will be described in detail. In the drawing the adjusting device of a brake rod linkage comprises an adjustable rod or spindle 1 which upon its free end is provided with a head 2 for connecting to the brake rod linkage. The connecting head is coaxial with respect to the rod 1 and is rotatably mounted upon an axial extension 3 of reduced diameter from the rod 1. A corrugated spring ring 4 is positioned upon the connecting head for the purpose of urging serrations or radially extending teeth 5 on the end of the connecting head 2 into mutual engagement with corresponding serrations or teeth 6 carried on the rod 1. The serrations 5 and 6 are in the shape of saw teeth and have a tip angle of about 45°. To facilitate centering of the teeth they are preferably mounted on mating conical surfaces coaxial to the rod 1 as shown in the drawing.

The serrations 6 are actually formed upon a disc 7 which is mounted on the axial extension 3. A cap 8 is threaded onto the disc 7 and the cap and disc 7 are both attached to the rod 1 by means of a transversely extending pin 9.

The cap 8 extends over the end of the connecting head 2 which is adjacent the adjustable spindle 1 and encloses the spring ring 4. One end of the spring bears against an annular flange 10 formed as a portion of the cap 8 and the other end bears against an annular disc 12 which is retained in position by a snap ring 13 positioned and seated in an annular groove on the outer surface of the connecting head 2. A sealing ring or packing 11 seals the cap against the connecting head 2. The disc 12 is provided with a hollow conical shape on one side thereof which partially encloses the snap ring 13 to retain the snap ring in its annular seat.

During a braking operation the adjustable rod 1 and the connecting head 2 are presed toward each other because of the braking forces and the serrations 5 and 6 are thus urged into tight mutual engagement. Upon release of the brakes, the rod 1 can be adjusted manually by means of a wrench placed on the outer surface of the cap 8 which may be provided with a hexagonal section. The adjusting device is thus reset with respect to the connecting head 2, since the serrations 5 and 6 can be moved with respect to each when the brakes are in the released position.

It will be understood that this invention is susceptible to modification in order to adapt it to different usages and conditions, and accordingly, it is desired to comprehend such modifications within this invention as may fall within the scope of the appended claims.

What is claimed is:

1. In a device for resetting an automatic adjusting device on a brake rod linkage for railway vehicles and the like, the combination of an adjustable rod, a brake rod linkage connecting head rotatably coupled to said rod coaxially therewith and axially moveable with respect thereto, mutually engageable serrations on said rod and head, a cap mounted on said rod and extending over the end of said head, spring means within said cap between a portion thereof and said head for urging said serrations into mutual engagement, a disc attached to said rod and having said rod serrations thereon, said cap being mounted on said disc, and a pin passing transversely through said cap, disc and rod to secure the cap and disc onto the rod.

2. In a device for resetting an automatic adjusting device on a brake rod linkage for railway vehicles and the like, the combination of an adjustable rod, a brake rod linkage connecting head rotatably coupled to said rod coaxially therewith and axially moveable with respect thereto, mutually engageable serrations on said rod and head, a cap mounted on said rod and extending over the end of said head, spring means within said cap between a portion thereof and said head for urging said serrations into mutual engagement, and a snap ring inserted into an angular groove on said head within said cap, a second disc on said cap engageable with said snap ring, said spring means acting against said second disc to urge said cap serrations into engagement with said rod serrations.

* * * * *